Sept. 24, 1946.    H. E. BESTE    2,408,193
PHASE SHIFTER
Filed Dec. 6, 1943
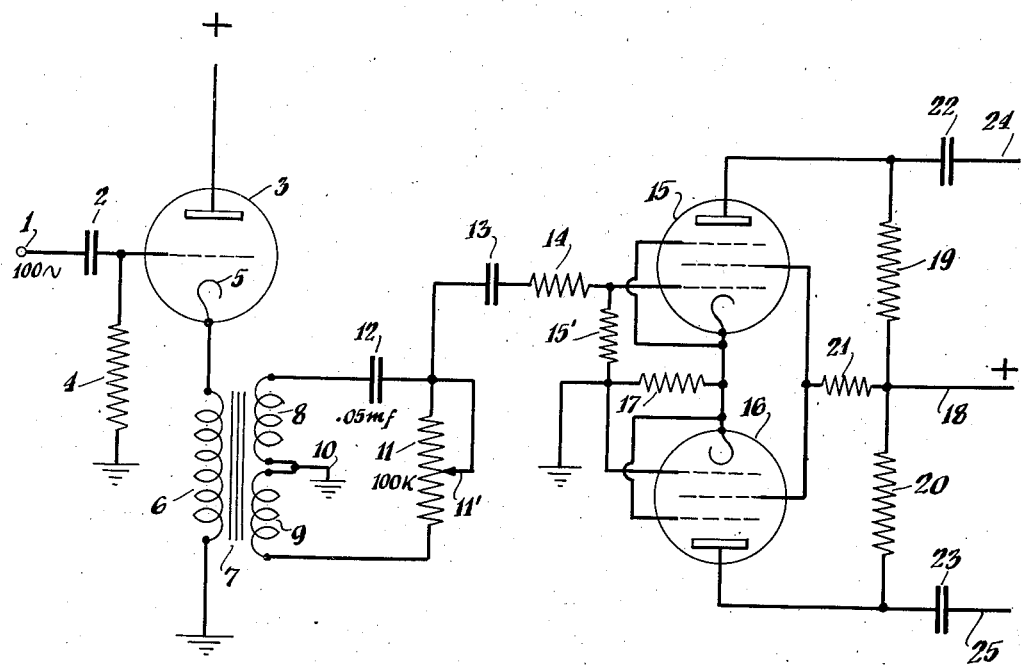
Harold Edward Beste INVENTOR.
BY
Charles W. Mortimer
ATTORNEY Patented Sept. 24, 1946

2,408,193

UNITED STATES PATENT OFFICE 2,408,193

PHASE SHIFTER

Harold Edward Beste, East Rutherford, N. J., assignor to Allen B. Du Mont Laboratories, Inc., Passaic, N. J., a corporation of Delaware Application December 6, 1943, Serial No. 513,136

4 Claims. (Cl. 172—246)

This invention relates to a phase shifter which comprises a transformer of which the primary is in the cathode circuit of a vacuum tube.

The invention may be understood from the description in connection with the accompanying drawing, in which reference character 1 indicates a connection from a source of alternating current which may, for example, be of a frequency of 100 c. p. s. The terminal 1 is coupled by condenser 2 to the grid of triode 3 which has grid leak 4. The cathode 5 of tube 3 is connected to one end of the primary 6 of transformer 7, the other end of which is grounded.

Two like coils 8 and 9 connected in series and grounded at the center 10 constitute the secondary of the transformer 7. The lower end of the secondary 9 is connected to one end of a variable resistance 11, and the upper end of the coil 8 is coupled by condenser 12 to the upper end of resistance 11. A sliding contact 11' is provided to vary the portion of the resistance 11 that is in the circuit.

A condenser 13 couples the phase shifter through resistance 14 to the control grid of triode 15, this grid being provided with a grid leak 15' to ground. The cathode of tube 15 is connected to the cathode of tube 16, and both are connected to ground through resistance 17. A lead 18 extends from a source of positive potential through load resistances 19 and 20 to the plates of the tubes 15 and 16. And this lead 18 is also connected through resistance 21 to the screen grids of the tubes 15 and 16 in the usual way.

The tubes 15 and 16 and connections constitute or provide a balanced phase-inverter deflection amplifier, from which signals of opposite polarity can be taken and coupled by condensers 22, 23 and leads 24, 25 to a pair of deflection plates of an oscillograph cathode-ray tube not shown.

The oscillations fed in at 1 and applied by tube 3 pass through the primary 6 of transformer 7, setting up voltages in the coils 8 and 9 which are of the same frequency as those in coil 6 but of opposite polarity thereto or 180° different from coil 6 in phase.

The phase of the voltages applied to the condenser 13 and therefore to the control grid of tube 15 depends upon the relative impedances of the condenser 12 and the portion of resistance 11 that is in series across the secondary 8, 9 of the transformer 7. When the contact 11' is at the lower end of resistance 11, the voltage at the grid of tube 15 is approximately 90° ahead of that across the secondary 8, 9, and the more of the resistance 11 that is placed in the circuit by moving contact 11' closer to the upper end of resistance 11 the nearer the voltage at the grid of tube 15 is in phase with the voltage across the secondary 8, 9.

The current through the coil 6 is not dependent upon the phase or amount of current through the coils 8 and 9, as this current depends primarily upon the voltages at the grid and plate of tube 3.

Due to the comparative low impedance and high current in coil 6, any change in phase due to adjustment of contact 11' results in very little, if any, change in voltage output of this phase shifter.

What is claimed is:

1. In an electronic device for shifting the phase of voltage, a vacuum tube to the control grid of which said voltage is to be applied, and a transformer having its primary connected between the cathode of said tube and ground, the ends of the secondary of said transformer being connected to a resistance and capacitance in series.

2. The device of claim 1, in which said resistance is variable.

3. The device of claim 1, in which an output lead is connected between said resistance and capacitance.

4. The device of claim 1, in which said secondary is grounded.

HAROLD EDWARD BESTE.